United States Patent [19]

Norton

[11] 4,409,551

[45] Oct. 11, 1983

[54] TELLURIC SURVEY ELECTRODE

[75] Inventor: Lonnie J. Norton, Cedar Hill, Tex.

[73] Assignee: Mobil Oil Corporation, New York, N.Y.

[21] Appl. No.: 176,897

[22] Filed: Aug. 11, 1980

[51] Int. Cl.³ .............................................. G01V 3/00
[52] U.S. Cl. .................................................. 324/349
[58] Field of Search .................. 324/65 R, 65 P, 323, 324/347–350, 357, 362

[56] References Cited

U.S. PATENT DOCUMENTS 1,826,961 10/1931 Slichter ........................... 324/347 X
2,212,273 8/1940 Martienssen ....................... 324/347
2,768,028 10/1956 Robinson ...................... 324/65 R X

OTHER PUBLICATIONS

"Terry Range Magneto-Telluric Survey" presented in 1968 by Societe Nationale des Petroles d'Aquitaine.

Primary Examiner—Gerard R. Strecker
Attorney, Agent, or Firm—Alexander J. McKillop; James F. Powers, Jr.; Frank J. Kowalski

[57] ABSTRACT

An electrode for use in telluric electrical energy measurements is disclosed which has the property of easy, rapid installation and retrieval while maintaining electrical stability. The electrode is durable and much more easily stored than prior art telluric electrical survey electrodes.

5 Claims, 4 Drawing Figures

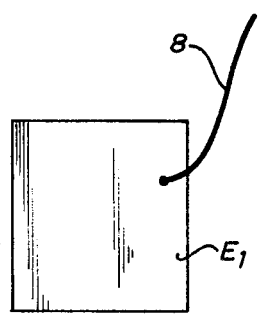
FIG. 1
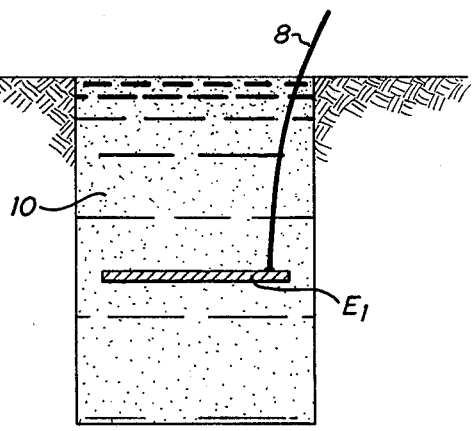
FIG. 2
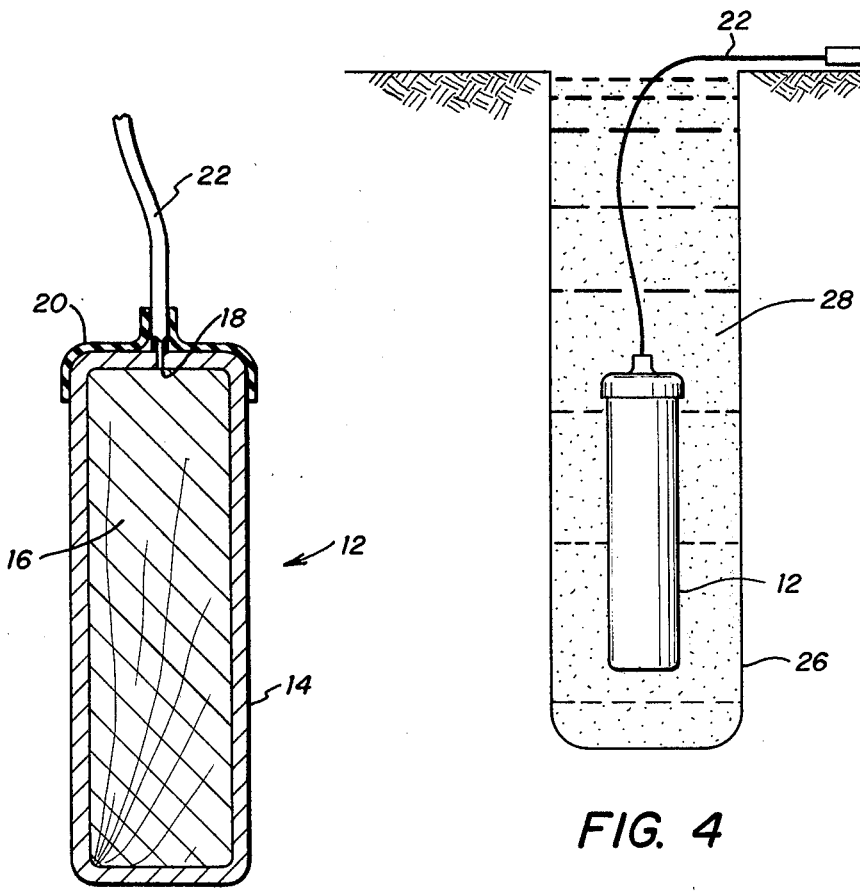
FIG. 3
FIG. 4

TELLURIC SURVEY ELECTRODE

BACKGROUND OF THE INVENTION

The present invention pertains to exploration electrodes and, more particularly, to exploration electrodes used in magnetotelluric measurements which determine the resistivity of sub-surface earth formations.

Presently, extensive geophysical and geological exploration is done particularly in the oil industry prior to drilling a producing well. Exploration is done from the initial stages to the final stage, which increase in cost accordingly. Although seismic exploration is the primary tool and is frequently performed prior to expensive well drilling, initial exploration tools are available for use in determining whether the expense of seismic exploration is justified in any potentially oil-bearing area. An initial exploration tool is a magnetotelluric survey, which measures the resistivity of formations in a given area to determine whether the resistances measured indicate a suitable sub-surface geology, depending upon the exploration objective.

A method for taking magnetotelluric measurements is to place four electrodes in a pattern defining a square with each electrode in a corner. Of the four electrodes, opposite corners of the square are paired. Electrical impulses are received from natural electrical energy in the earth from one electrode to the other electrode of the pair. For complete magnetotelluric survey information an electromagnetic coil is needed to measure the magnetic effects of the earth at the location being surveyed. The electrode pairs give the E components of the survey, normally designated as $E_x$ and $E_y$. The E measurements are correlated with H measurements ($H_x$ and $H_y$) which are detected by the electromagnetic coil. Resolution of the exact point for which the resistivity is being measured at a given depth deteriorates as a greater depth is surveyed. The frequency of the electrical waves indicates the depth of the formation for which the resistance is measured. For example, the resistance of a shallow sub-surface formation can be measured by detecting high frequency electromagnetic waves. To obtain the resistance of deeper formations, lower frequencies of the telluric waves are measured. The depth of the formation having the measured resistivity is calculated by combining the telluric electrical energy and the magnetic field measured. Due to the deterioration of the telluric signal, lower frequencies measuring the resistivity of deeper formations will indicate a resistivity that may be the resistivity of an infinite number of points on a common depth plane. For a more detailed discussion of magnetotelluric surveying and electrode placement techniques, reference is made to a pending application "Multiple Site Magnetotelluric Measurements" Ser. No. 63,491 filed by Marvin A. Bloomquist, et al, assigned to the same assignee as the present application.

The first type of telluric electrical survey electrodes were glass containers filled with cadmium chloride. These electrodes provided problems in deployment and retrieval along with their potential toxicity if broken. Initially, more durable electrodes made from a conductive metal such as lead were considered undesirable due to the noise associated with lead electrodes. However, once the outer layer of a lead electrode oxidizes, the noise is greatly reduced.

Present telluric electrodes are normally a square plate constructed of lead having a single conductor affixed thereto connecting the electrode to an amplifier. As illustrated in FIGS. 1 and 2, the electrode is normally placed in a hole manually dug into the ground. This hole is typically one to two feet deep. On top of the electrode is normally placed a mud slurry, as shown at 10 in FIG. 2. This deployment procedure has many disadvantages, one of which is the cost associated with manually or mechanically digging a hole large enough to place the flat lead plate electrode. However, as great a problem as deployment of telluric electrodes may be, retrieval presents a greater problem. To retrieve the flat plate electrode E, the hole must be redug, which may result in damage to the lead plate from contact with the shovel. Even though the mud covering the electrode is generally in liquid form, the electrode cannot be merely pulled out of the ground due to its configuration (See FIG. 2). Conductor 8 merely pulls out of electrode E. Since a hole must be dug for each electrode, the time and cost required for deployment and retrieval of a line of electrodes is proportional as the length of the line increases to the number of sites in the survey.

SUMMARY OF THE INVENTION

Present invention removes the deficiencies of expense and time consumption of prior art magnetotelluric survey electrodes. The present invention comprises an elongated electrode containing insulation material and connected to an amplifier or recorder through a fixed electrical connector. The present invention may be inserted in a hole dug in the ground, mechanically (or manually) through an auger type hole digger and filled with mud slurry. For removal, the present invention may be pulled from the hole without requiring that the hole be redug. Thus, the present invention reduces the requirement of man-hours for electrode placement resulting in savings of both cost and time. Furthermore, due to its construction, the present invention is easily stored between uses, also resulting in time and cost savings.

BRIEF DESCRIPTION OF THE DRAWINGS

FIG. 1 is a prior art magnetotelluric survey electrode.

FIG. 2 illustrates prior art placement methods of magnetotelluric electrodes.

FIG. 3 is a preferred embodiment of the present invention.

FIG. 4 illustrates placement of the present invention.

DESCRIPTION OF THE PREFERRED EMBODIMENT

As illustrated in FIGS. 1 and 2, prior art magnetotelluric electrodes require many man-hours in placement to assure electrical stability and additional man-hours in retrieval. Furthermore, prior art magnetotelluric electrodes require care in storage due to their shape and physical size, both in weight and volume. Referring now to FIG. 3, the present invention is illustrated as comprising the housing 14 containing insulating material 16, conductive connection 18, insulating means 20, and conductor 22. Conductor 22 may be connected to a recording instrument (not shown) for recording electromagnetic energy received from the earth's formation.

In actual construction, housing 14 is preferably constructed of a heavy conductive metal such as lead. However 14 may be of any elongated shape to provide a large external surface area, however, a generally cylindrical shape is preferred for ease of manufacture.

Housing 14 is preferably hollow to provide a lightweight electrode, however, a solid electrode may be used. Lead has the additional advantage of being malleable and reduced to liquid at relatively low temperatures. Insulating material 16 may be of any type that is solid and not easily deformed such as porcelain, hard rubber or plastic, however, a wood dowel is preferred. Due to the high degree of malleability of lead, its shape may be easily altered through careless treatment. A wood dowel adds durability to the shape of and provides a framework for housing 14 while not adding electromagnetic noise to a received telluric signal. If a solid housing 14 is used, insulating material 16 is not required. Insulating material 16 such as a wooden dowel is inserted in a housing 14 such as a lead pipe. The ends of housing 14 are then folded over the insulating material and melted to form an airtight seal. Additional melted lead may be added to assure an airtight seal. Conductor 22 is inserted and soldered on to one end of housing 14 forming conductive connection 18. Conductor 22 may be any type of conductor currently used in electrical connections, however, a heavy gauge copper wire is preferred. Conductive connection 18 may simply be a soldered connection, however, insertion of a stripped insulated heavy gauge copper wire as conductor 22 into a heated and molten end of housing 14 is preferred. Insulating means 20 is placed over conductive connection 18 to prevent electrical shorting between housing 14 and conductor 22 through the water contained in mud 28.

If conductive connection 18 is not insulated, a galvanic cell is established between the lead electrode, the copper conductor and moisture. The potential set up by the galvanic cell is often large enough to block conduction of the telluric signals detected by electrode 12.

The placement and operation of present invention of FIG. 3 is illustrated in FIG. 4. A circular hole 26 is dug into the ground preferably by an auger attachment to a machine such as a tractor. The hole is preferably one to two feet deep and four to six inches in diameter, however, one skilled in the art may easily determine other dimensions. Hole 26 may then be partially filled with mud slurry 28 to provide a bottom for electrode 12. Electrode 12 may then be inserted into hole 26 and manually held in place while hole 26 is filled with mud slurry 28. Conductor 22 is brought out of hole 26 and may be connected to an amplifier (not shown). Normally, the line of approximately six magnetotelluric survey electrodes in groups of four are placed into position and naturally occurring electrical energy is measured. As discussed previously, the frequency of the electrical energy indicates the depth at which resistivity is measured. High frequency electrical energy measures the resistance of sub-surface formations close to the ground level in near proximity of the electrodes. As the measured frequency of the electromagnetic energy is decreased the resistance of sub-surface formations at extreme depths may be measured.

As indicated by the construction of the present invention, the number of man-hours required for placement of the electrodes and retrieval of the electrodes is greatly reduced. Holes in which electrode 12 is placed no longer need to be extremely large and may be mechanically provided by instruments such as an auger posthole digger. Retrieval of the present invention is greatly simplified due to its shape. Mud 28 does not act as a great retarding force against electrode 12 in the manner that mud 10 prevented retrieval of electrode E as described in FIG. 2. Thus, electrode 12 is merely pulled from hole 26 by conductor 22, and need not be manually excavated when recording is finished. Due to its construction, the present invention provides a durable easily stored telluric survey electrode, while maintaining electrical stability.

The present invention has been described by way of the foregoing preferred embodiment for illustration only and should not be limited thereto but only by the scope of the following claims.

What I claim is:

1. A telluric survey electrode for temporary ground insertion comprising:
   elongated-housing constructed of an electrically conductive metal;
   insulating means within said housing for fortifying said housing;
   connector means soldered to one end of said elongated housing for removal of said survey electrode from the ground and for providing an electrical path to and from said electrode; and
   sealing means at each end of said housing having at least one end soldered for providing a generally smooth airtight barrier between said connector means and outside ambiance.

2. The telluric survey electrode according to claim 1 wherein said connector means comprises a heavy gauge electrical wire.

3. The telluric survey electrode according to claim 2 when said sealing means comprises metallic solder.

4. The telluric survey electrode according to claim 2 when said sealing means comprises molten lead cooled to form a seal with said housing.

5. The telluric survey electrode according to claim 1 where said sealing means comprises molten lead added to folded over ends of said housing to form a smooth surface.

* * * * *